(12) United States Patent
Hioki

(10) Patent No.: US 10,908,581 B2
(45) Date of Patent: Feb. 2, 2021

(54) NUMERICAL CONTROL APPARATUS AND NUMERICAL CONTROL METHOD

(71) Applicant: OKUMA Corporation, Aichi (JP)

(72) Inventor: Katsuya Hioki, Aichi (JP)

(73) Assignee: OKUMA CORPORATION, Aichi (JP)

( * ) Notice: Subject to any disclaimer, the term of this patent is extended or adjusted under 35 U.S.C. 154(b) by 0 days.

(21) Appl. No.: 16/558,716

(22) Filed: Sep. 3, 2019

(65) Prior Publication Data

US 2020/0073357 A1    Mar. 5, 2020

(30) Foreign Application Priority Data

Sep. 5, 2018 (JP) .................................. 2018-166155

(51) Int. Cl.
*G05B 19/19*        (2006.01)

(52) U.S. Cl.
CPC .... *G05B 19/19* (2013.01); *G05B 2219/34015* (2013.01); *G05B 2219/49101* (2013.01)

(58) Field of Classification Search
None
See application file for complete search history.

(56) References Cited

U.S. PATENT DOCUMENTS

| 5,723,961 A * | 3/1998 | Fujino | G05B 19/4103 318/568.15 |
| 7,693,588 B2 * | 4/2010 | Hong | G05B 19/416 700/61 |
| 2001/0024098 A1 * | 9/2001 | Takahashi | G05B 19/41 318/569 |
| 2014/0195037 A1 * | 7/2014 | Nishibashi | G05B 19/4103 700/188 |

FOREIGN PATENT DOCUMENTS

| JP | 2566276 B2 | 12/1996 |
| JP | 2003067020 A | 3/2003 |
| JP | 2003330517 A | 11/2003 |

* cited by examiner

*Primary Examiner* — Ryan A Jarrett
(74) *Attorney, Agent, or Firm* — Cantor Colburn LLP

(57) ABSTRACT

A numerical control apparatus includes: a curvature radius calculating portion which calculates a first radius $r_a$ which is a radius of a passage arc C passing through three points of a start point $P_s$, an object point $P_t$, and an end point $P_e$ as a curvature radius R at the object point $P_t$; a point sequence evaluating portion which calculates a chord error E to the passage arc C and compares the calculated chord error E and a previously defined permissible error; and a curvature radius correcting portion which calculates a second radius which is a radius of an arc in which a chord error with a front line segment and a rear line segment is the permissible error or less when the calculated chord error E exceeds the permissible error and corrects a curvature radius at the object point $P_t$ to the second radius.

5 Claims, 8 Drawing Sheets

NUMERICAL CONTROL APPARATUS AND NUMERICAL CONTROL METHOD

CROSS REFERENCE TO RELATED APPLICATION

The present application claims priority under 35 U.S.C. § 119 to Japanese Patent Application No. 2018-166155 filed on Sep. 5, 2018, the entire content of which is incorporated herein by reference.

TECHNICAL FIELD

The present specification discloses a numerical control apparatus which controls movement of a drive axis of a machine in accordance with a machining program, and a numerical control method.

BACKGROUND

To machine workpieces including various shapes, each drive axis of a machine tool is controlled by being moved in accordance with position command data generated by a machining program. Here, the machining program records coordinates of a plurality of moving points of the drive axis. In such machine tool, in order to improve quality of a machining surface, a passing feed rate of each drive axis on the machining surface needs to be stabilized.

Consequently, a function of determining a permissible passing speed of the drive axis at each moving point is incorporated into a numerical control apparatus which controls the drive of a machine tool. More specifically, to prevent a shock to each drive axis, the numerical control apparatus sets a limited value to a feed rate variation per unit time (hereinafter, it is referred to as "acceleration"); that is, a permissible acceleration $\alpha$, and determines a speed of each drive axis within the permissible acceleration $\alpha$.

Here, in corner portions such as a small R portion and an angular portion, a moving ratio of each drive axis varies, so that acceleration is generated. A technology of not exceeding the permissible acceleration $\alpha$ has been conventionally proposed also in such a corner portion.

For example, JP 2566276 B discloses that a radius of a passage circle passing through three points of an object point and a start point as well as an end point positioned before and after the object point is calculated as a curvature radius R at the object point, and based on the curvature radius R and a permissible acceleration $\alpha$, a permissible passing speed F at the object point is obtained by the following Formula 1.

$$F=\sqrt{\alpha \cdot R} \qquad \text{Formula 1}$$

Here, as clear from Formula 1, the permissible passing speed F largely depends on the curvature radius R. As described above, the curvature radius R is a radius of a passage arc passing through three points. However, the radius of the passage arc may largely differ depending on as aspect of linear approximation to a target curved line when a machining program is generated by CAM, etc. As a result, the permissible passing speed F may largely differ although the shapes are originally similar. For example, while one machining path and an adjacent machining path often have similar shapes, depending on an aspect of linear approximation, the curvature radius R and thus passing speeds applied to the respective machining paths may largely differ. Such difference in passing speeds causes quality loss of a machining surface.

The present specification discloses a numerical control apparatus which further improves quality of a machining surface, and a numerical control method.

SUMMARY

The present specification discloses a numerical control apparatus which controls movement of a drive axis of a machine in accordance with a machining program, the numerical control apparatus including: a curvature radius calculating portion which calculates a first radius which is a radius of a passage arc passing through three points of a start point, an object point, and an end point which are continuously present among a plurality of moving points of the drive axis recorded in the machining program as a curvature radius at the object point; a point sequence evaluating portion which calculates a chord error which is an approximation error between the passage arc and a front line segment connecting the object point and the start point or a rear line segment connecting the object point and the end point and compares the calculated chord error and a previously defined permissible error; a curvature radius correcting portion which calculates a second radius which is a radius of an arc in which a chord error with the front line segment and the rear line segment is the permissible error or less when the calculated chord error exceeds the permissible error and corrects a curvature radius at the object point to the second radius; and a speed calculating portion which calculates a permissible passing speed of the drive axis at the object point based on the curvature radius at the object point.

With this configuration, when a chord error is large; that is, when a first radius of a passage arc is inappropriate, a permissible passing speed is calculated by replacing the first radius with a second radius in which a chord error is within a permissible error. As a result, variation of the permissible passing speed is inhibited, and thus quality of a machining surface may be improved.

In this case, it is acceptable that the curvature radius correcting portion calculates the second radius rb based on a formula of $rb=Edef/(1-\cos(\theta/2))$, wherein an angle at the object point in movement from a start point passing through the object point to advance to an end point is $\theta$, and the permissible error is Edef.

With this configuration, the second radius rb in which an approximation error is the permissible error Edef may be easily obtained.

Also, it is acceptable that the point sequence evaluating portion calculates an approximation error between the passage arc and the rear line segment as an outward path chord error, and calculates an approximation error between the passage arc and the front line segment as a return path chord error, and the speed calculating portion calculates a permissible passing speed based on a smaller curvature radius between a curvature radius specified based on the outward path chord error and a curvature radius specified based on the return path chord error.

With this configuration, the permissible passing speed may be determined while considering chord errors in both an outward path and a return path. As a result, even when workpiece is machined by reciprocating the drive axis, quality of the machining surface may be improved.

In this case, it is acceptable that the curvature radius correcting portion specifies the first radius as an outward path curvature radius when the outward path chord error is the permissible error or less, specifies the second radius as the outward path curvature radius when the outward path chord error exceeds the permissible error, specifies the first radius as a return path curvature radius when the return path chord error is the permissible error or less, and specifies the second radius as the return path curvature radius when the return path chord error exceeds the permissible error, and then corrects a smaller value between the outward path curvature radius and the return path curvature radius as the curvature radius at the object point.

With this configuration, the curvature radius easily becomes a small value, and also the permissible passing speed easily becomes a small value. This prevents a passing speed from becoming excessively large.

The present specification discloses a numerical control method of controlling movement of a drive axis of a machine in accordance with a machining program, the method including the steps of: calculating a radius of a passage arc passing through three points of a start point, an object point, and an end point which are continuously present among a plurality of moving points of the drive axis recorded in the machining program as a first radius; calculating a chord error which is an approximation error between the passage arc and a front line segment connecting the object point and the start point or a rear line segment connecting the object point and the end point to compare the calculated chord error and a previously defined permissible error; calculating a second radius which is a radius of an arc in which a chord error with the front line segment and the rear line segment is the permissible error or less when the calculated chord error exceeds the permissible error to correct a curvature radius at the object point to the second radius; and calculating a permissible passing speed of the drive axis at the object point based on the curvature radius at the object point.

With this configuration, when the chord error is large; that is, when the first radius of the passage arc is inappropriate, the permissible passing speed is calculated by replacing the first radius with the second radius in which the chord error is within the permissible error. As a result, variation of the permissible passing speed is inhibited, and thus quality of the machining surface may be improved.

According to the numerical control apparatus and the numerical control method disclosed in the present specification, quality of the machining surface may be further improved.

BRIEF DESCRIPTION OF DRAWINGS

Embodiments of the present disclosure will be described based on the following figures, wherein.

EMBODIMENTS

Figure 1:
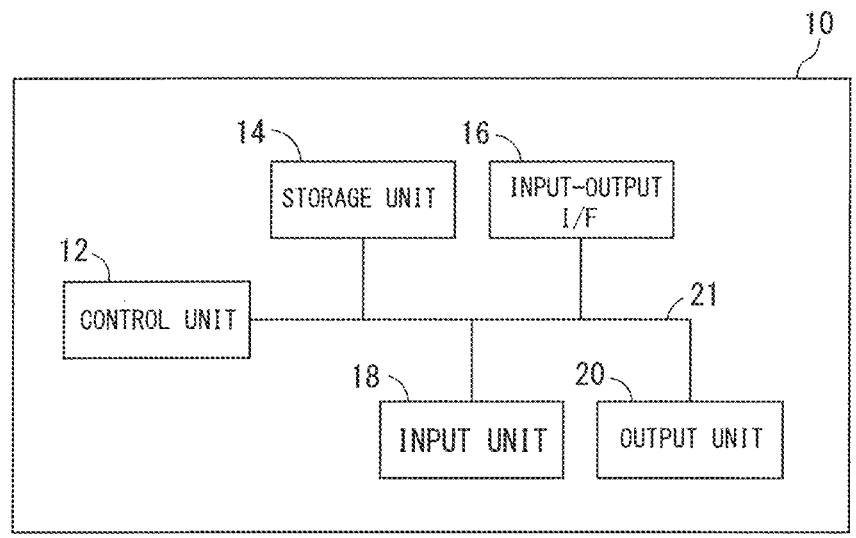
FIG. 1 is a physical block diagram of a numerical control apparatus.
Figure 2:
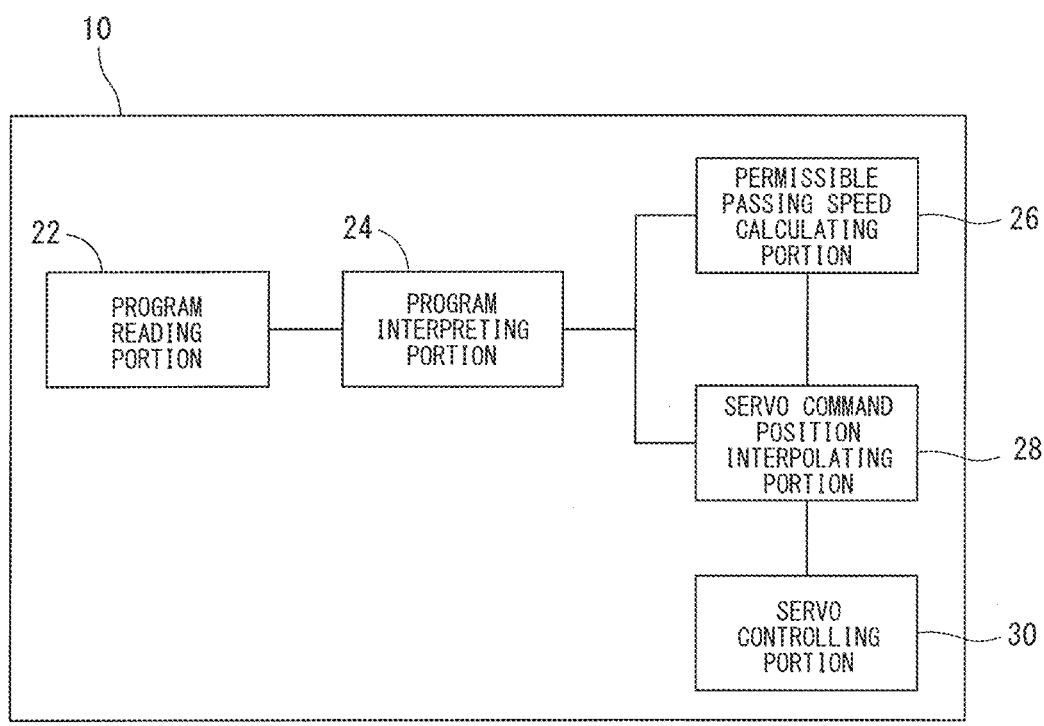
FIG. 2 is a functional block diagram of the numerical control apparatus.
Figure 3:
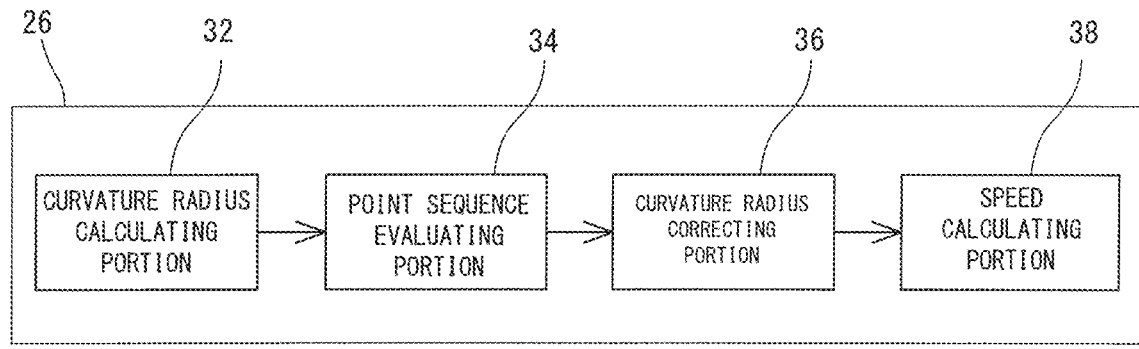
FIG. 3 is a detailed block diagram of a permissible passing speed calculating portion.

Hereinafter, a configuration of a numerical control apparatus 10 will be explained with reference to the drawings. FIG. 1 is a physical block diagram of the numerical control apparatus 10. FIG. 2 is a functional block diagram of the numerical control apparatus 10, and FIG. 3 is a detailed block diagram of a permissible passing speed calculating portion 26.

The numerical control apparatus 10 controls the drive of a drive axis of a machine tool, and is incorporated into the machine tool. Physically, the numerical control apparatus 10 is a computer which includes a control unit 12, a storage unit 14, an input-output interface (hereinafter, referred to as "input-output I/F") 16, an input unit 18, an output unit 20, and a data bus 21 which connects these components.

The control unit 12 is constituted by one or more CPUs for example, and performs various kinds of calculations in accordance with a control program stored in the storage unit 14. The storage unit 14 stores various kinds of data and the controlling program. Further, the storage unit 14 is broadly divided into a primary storage unit which can be directly accessed by the CPU and a secondary storage unit which is accessed using an input-output channel, etc. The primary storage unit is constituted by a semiconductor memory such as a ROM, a SRAM, or a DRAM. The secondary storage unit is constituted by, for example, a magnetic-storage device (for example, a hard disc drive) and a semiconductor memory device (for example, a solid-state drive.) The storage unit 14 stores a control program which allows the computer to function as the numerical control apparatus 10. Also, the storage unit 14 stores numerical values such as a permissible acceleration α and a permissible error Edef which will be described later.

The output unit 20 outputs various types of information to a user, and is constituted by a display, a speaker, a printer, or a lamp, for example. The input unit 18 accepts an operation of the user, and is constituted by a keyboard, a mouse, a touch panel, a microphone, or a camera, for example.

Such numerical control apparatus 10 is generally incorporated into a machine tool which is an object of control to be integrated therewith. However, a part or the entire of the numerical control apparatus 10 may be separated from the machine tool which is an object of control, as appropriate. Consequently, for example, a computer incorporated into a machine which is an object of control and an information terminal which can communicate with the computer may constitute one numerical control apparatus 10.

The numerical control apparatus 10 functionally includes a program reading portion 22, a program interpreting portion 24, the permissible passing speed calculating portion 26, a servo command position interpolating portion 28, and a servo controlling portion 30. The program reading portion 22 reads in a machining program designated by the user. The machining program includes a coordinate value of a moving point of the drive axis, and is an NC program, for example. Such machining program is generally generated by CAM. The read machining program is interpreted in the program interpreting portion 24. The program interpreting portion 24 outputs an interpretation result to the permissible passing speed calculating portion 26 and the servo command position interpolating portion 28.

The permissible passing speed calculating portion 26 calculates a curvature radius R at an object point Pt which is one of moving points of the drive axis, and calculates a permissible passing speed F at the passage of the object point Pt based on the curvature radius R. A calculation method of the radius of curvature R and the permissible passing speed F will be described later.

The servo command position interpolating portion 28 interpolates a servo command position to each drive axis in accordance with the interpretation result interpreted by the program interpreting portion 24. At this time, the servo command position interpolating portion 28 calculates a passing speed at the object point Pt such that the passing speed at the object point Pt does not exceed the permissible passing speed F. The servo controlling portion 30 controls a servo motor of each drive axis in accordance with a servo position command to the drive axis obtained by the servo command position interpolating portion 28. The above-described functions of each of the portions 22 to 30 can be achieved when the control unit 12 performs a calculation process in accordance with the control program stored in the storage unit 14.

Next, the permissible passing speed calculating portion 26 will be explained. As shown in FIG. 3, functionally, the permissible passing speed calculating portion 26 is broadly divided into a curvature radius calculating portion 32, a point sequence evaluating portion 34, a curvature radius correcting portion 36, and a speed calculating portion 38. Before an explanation of the functions of these portions 32 to 38, a calculation principle of the permissible passing speed F in the permissible passing speed calculating portion 26 will be explained.

Figure 4:
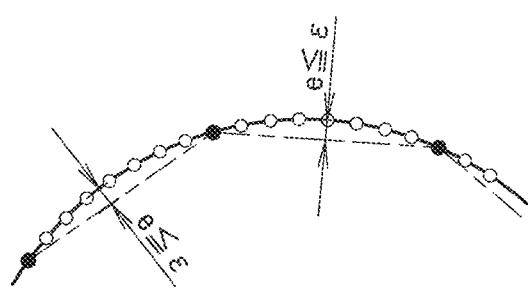
FIG. 4 is a drawing showing an example of linear approximation of a certain curved surface.

As explained above, the machining program includes a coordinate of a moving point of the drive axis. Such machining program including the moving point is generated by a program generation unit such as CAM based on a target shape. The program generation unit performs linear approximation to a curved surface which is the target shape in a range not exceeding a permissible approximation error ε at curved surfaces such as a corner portion. For example, the CAM thins out points provided on a curved surface at even intervals in a range not exceeding the permissible approximation error ε, and approximates a curved surface by a plurality of straight lines connecting remained points to each other. FIG. 4 is a drawing showing an example of linear approximation of a certain curved surface. In FIG. 4, bold solid lines show an original curved surface, and chain lines show a result of linear approximation. Also, in FIG. 4, white circles show points thinned out in the linear approximation. Approximation errors e of the approximated lines are the permissible approximation error ε or less.

In this way, a coordinate value of each point obtained by linear approximation of the original curved surface is recorded in the machining program together with G-code, etc. as the moving point of the drive axis. The permissible passing speed calculating portion 26 obtains the curvature radius R of the object point Pt which is one of the moving points, and based on the following formula 1, obtains the permissible passing speed F at the object point Pt. Moreover, when the permissible passing speed F at one object point Pt is obtained, the next point is set to a new object point Pt. Moreover, processing of obtaining the permissible passing speed F at the new object point Pt is repeated, so that the permissible passing speed F is obtained regarding all the moving points.

$$F=\sqrt{\alpha \cdot R} \quad \text{Formula 1}$$

Figure 5:
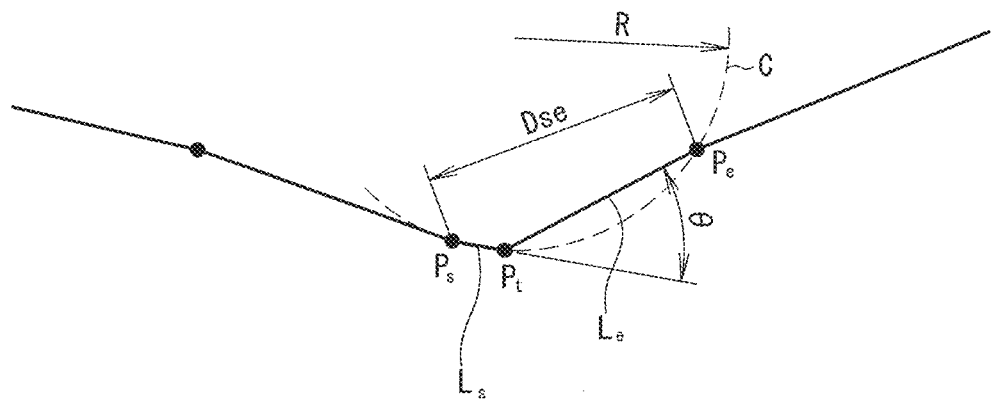
FIG. 5 is a drawing showing an example of point sequence at a corner portion.

Here, conventionally, a radius of an arc passing through three points of an object point Pt and a start point Ps as well as an end point Pe positioned before and after the object point Pt has been defined as a curvature radius R. Hereinafter, an arc passing through these three points is defined as a passing arc C and a radius thereof is defined as a first radius ra. Calculation of the first radius ra will be explained with reference to FIG. 5. FIG. 5 is a drawing showing an example of point sequence at a corner portion; especially, a corner portion in which a gentle curved surface continues before and after a small R portion. Among this point sequence, a radius of the passing arc C passing through three continuously present points Ps, Pt, and Pe (a first radius ra) is obtained from the following formula 2.

$$ra=Dse/(2 \cdot \sin(\theta)) \quad \text{Formula 2}$$

In Formula 2, Dse is a straight-line distance from the start point Ps to the end point Pe. Also, in Formula 2, θ is an angle θ in an advancing direction made in the movement from the start point Ps to the object point Pt, and then advancement to the end point Pe. In other words, θ is a supplementary angle of an angle made by a front line segment Ls connecting the start point Ps and the object point Pt and a rear line segment Le connecting the object point Pt and the end point Pe.

Figure 6:
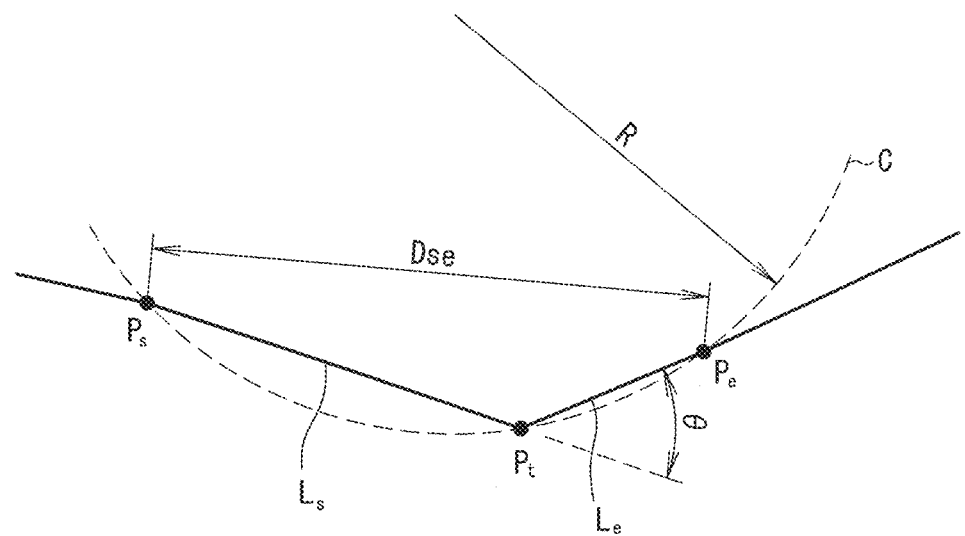
FIG. 6 is a drawing showing another example of linear approximation of a curved surface which is similar to FIG. 5.

Conventionally, calculation has been made by defining the first radius ra obtained from Formula 2 as a curvature radius R at the object point Pt, and the permissible passing speed F has been calculated based on this curvature radius R. Here, as clear from Formula 2, the first radius ra depends on the distance Dse and the angle θ. Moreover, the distance Dse has frequently widely varied in a process of linear approximation to the target shape by the CAM. Regarding this, an explanation will be made with reference to FIG. 6. FIG. 6 is a drawing showing another example of linear approximation of a curved surface which is similar to FIG. 5.

As clear from comparison between FIG. 5 and FIG. 6, even when liner approximation of similar curved lines is executed, positions of the obtained points may vary widely. In the examples in FIG. 5 and FIG. 6, while the positions of the object point Pt are substantially the same, in a case of FIG. 6, compared with FIG. 5, the position of the start point Ps is far away from the object point Pt. Such difference is based on the positions of points which are thinned out in linear approximation of the original curved surface.

Even when the positions of the points are largely varied, the angle θ does not largely vary. On the other hand, the distance Dse from the start point Ps to the end point Pe largely varies. As a result, even in similar shapes, the first radius ra and thus the permissible passing speed F may largely vary. In this way, when there are adjacent machining paths in which the first radii ra are largely varied, an edge of a tool may cut the workpiece with different intervals, or the cutting depth of the tool may be different. As a result, a machining mark has been uneven, which frequently deteriorates the quality of a machining surface.

In this example, after the first radius ra is calculated, evaluation is made as to whether point sequence is excessively thinned out based on this first radius ra, and the curvature radius R is corrected when the point sequence is thinned out excessively, and moreover, the permissible passing speed F is calculated based on this corrected curvature radius R. Hereinafter, the configuration of the permissible passing speed calculating portion 26 which executes such processing will be explained in detail.

The curvature radius calculating portion 32 obtains the curvature radius R at the object point Pt. More specifically, the curvature radius calculating portion 32 obtains the first radius ra which is a radius of a passing arc which passes through three points of the object point Pt and the start point Ps as well as the end point Pe positioned before and after the object point Pt, and output this first radius ra as the curvature radius R. The first radius ra is calculated based on the above Formula 2.

Figure 7:
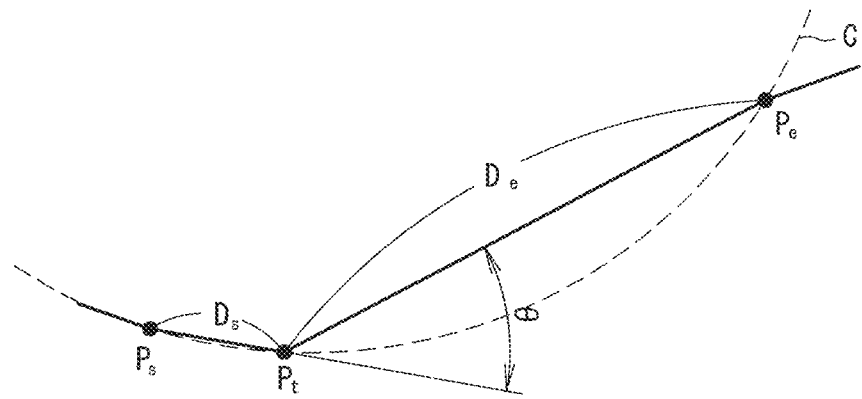
FIG. 7 is a drawing which explains each parameter.
Figure 8:
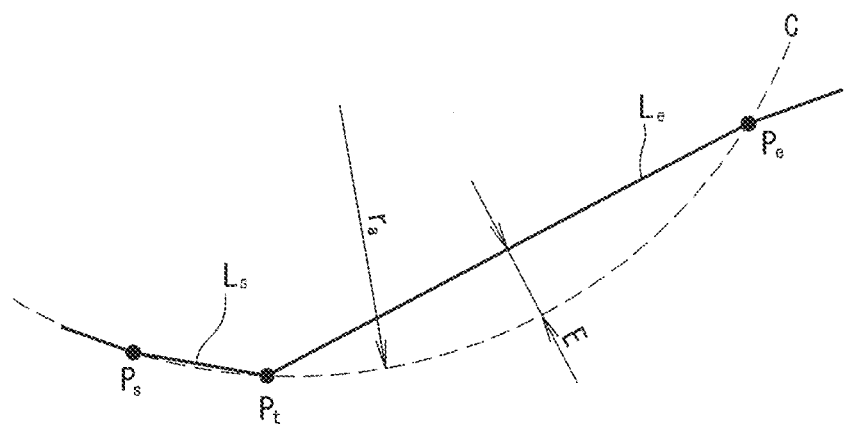
FIG. 8 is a drawing which explains a chord error E.
Figure 9:
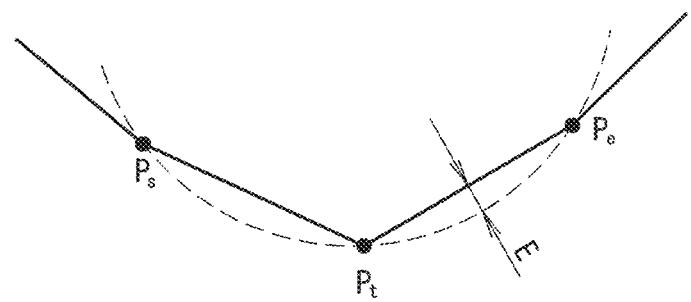
FIG. 9 is a drawing which explains a difference of the chord error E depending on an arrangement of point sequence.
Figure 9:
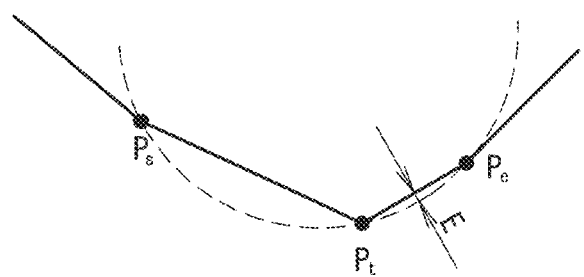
Figure 9:
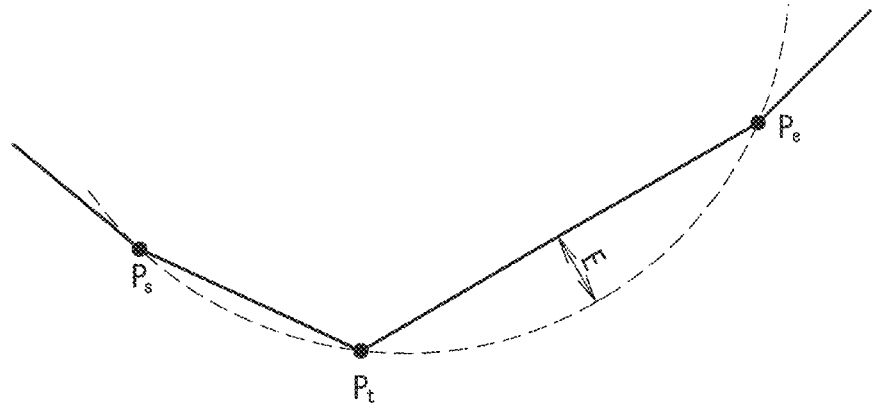

The point sequence evaluating portion 34 evaluates point sequence before and after the object point Pt based on the curvature radius R (the first radius ra) calculated by the curvature radius calculating portion 32. Regarding this, a concrete explanation will be made with reference to FIG. 7 to FIG. 9. FIG. 7 is a drawing which explains each parameter, and FIG. 8 is a drawing which explains a chord error E. Also, FIG. 9 is a drawing which explains a difference of the chord error E depending on an arrangement of point sequence. As shown in FIG. 7, in the following drawings, the length of the front line segment Ls (the distance from the start point Ps to the object point Pt) is defined as a front distance Ds, while the length of the rear line segment Le (the distance from the object point Pt to the end point Pe) is defined as a rear distance De.

The point sequence evaluating portion 34 obtains a chord error E of the passing arc C to evaluate point sequence. The chord error E is an approximation error of the rear line segment Le to the passing arc C, and more specifically, as shown in FIG. 8, the distance from a midpoint of the rear line segment Le to the passing arc C.

As shown in FIG. 9, if the front distance Ds and the angle θ are the same, the smaller the rear distance De, the smaller the chord error E, while the larger the rear distance De, the larger the chord error E. In other words, when the chord error E is excessively large, points are excessively thinned out, so that it can be determined that the distance between the object point Pt and the end point Pe (the rear distance De) is large. Such chord error E can be obtained by the following Formula 3.

$$E = R - \{(De \cdot \cos(\theta) + Ds)/(2 \cdot \sin(\theta))\} \quad \text{Formula 3}$$

Figure 10:
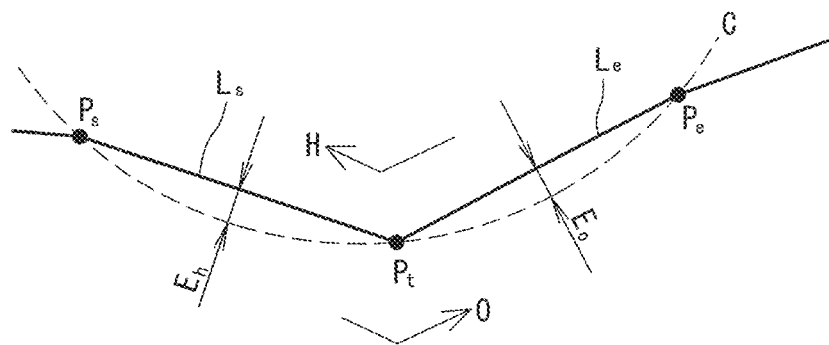
FIG. 10 is a drawing which explains an outward path chord error and a return path chord error.

Incidentally, in the above explanation, a case of moving from the start point Ps passing through the object point Pt to advance to the end point Pe has been explained. However, generally in machining of workpiece, the drive axis frequently reciprocates. In other words, there are cases where the drive axis advances in a direction of an arrow O in FIG. 10 (hereinafter, it is referred to as "an outward path direction") and where the drive axis advances in a direction of an arrow H (hereinafter, it is referred to as "a return path direction").

Here, a chord error in advancement in the outward path direction is a chord error between the rear line segment Le and the passing arc C (hereinafter, it is referred to as "an outward path chord error Eo"), while an chord error in advancement in the return path direction is a chord error between the front line segment Ls and the passing arc C (hereinafter, it is referred to as "a return path chord error Eh"). When reciprocating machining of workpiece is executed, the necessity of correction of the curvature radius R may be determined based on both the outward path chord error Eo and the return path chord error Eh.

The point sequence evaluating portion 34 calculates the outward path chord error Eo and the return path chord error Eh based on the following Formulas 4 and 5, respectively.

$$Eo = R - \{(De \cdot \cos(\theta) + Ds)/(2 \cdot \sin(\theta))\} \quad \text{Formula 4}$$

$$Eh = R - \{(Ds \cdot \cos(\theta) + De)/(2 \cdot \sin(\theta))\} \quad \text{Formula 5}$$

If the outward path chord error Eo and the return path chord error Eh are calculated, then the point sequence evaluating portion 34 compares the outward path chord error Eo as well as the return path chord error Eh with the previously set permissible error Edef. While a value of the permissible error Edef is not particularly limited, this may be set to the same value as the permissible approximation error ε used when the machining program is generated. The point sequence evaluating portion 34 outputs to the curvature radius correcting portion 36 a comparison result of the curvature radius R (the first radius ra) calculated by the curvature radius calculating portion 32 and the permissible error Edef.

The curvature radius correcting portion 36 calculates an outward path curvature radius Ro and a return path curvature radius Rh based on the comparison result, and corrects the curvature radius R based on the calculated two curvature radii Ro and Rh. More specifically, when the outward path chord error Eo is the permissible error Edef or less, the curvature radius correcting portion 36 temporarily stores the curvature radius R (=ra) as the outward path curvature radius Ro. On the other hand, when the outward path chord error Eo exceeds the permissible error Edef, the curvature radius correcting portion 36 temporarily stores a second radius rb calculated by the following Formula 6 as the outward path curvature radius Ro.

$$rb = Edef/(1 - \cos(\theta/2)) \quad \text{Formula 6}$$

Figure 11:
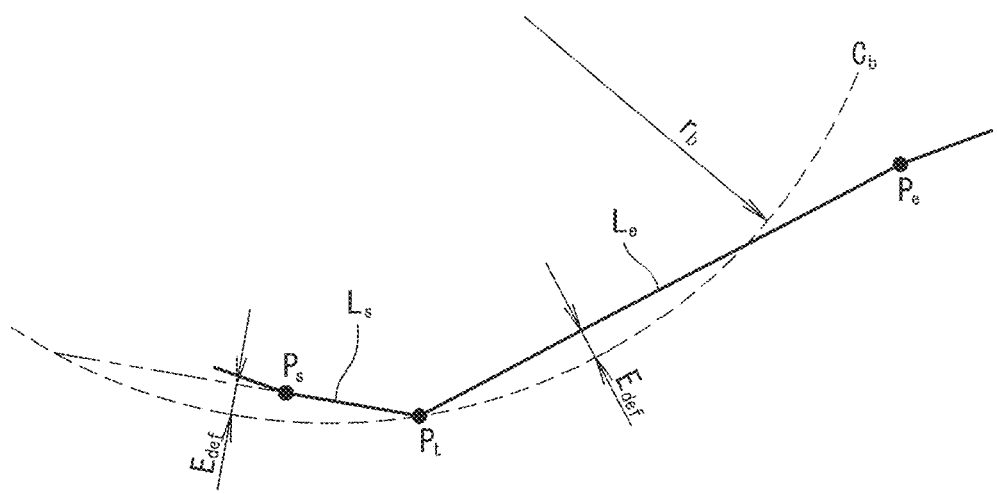
FIG. 11 is an image diagram of a second radius.

The second radius rb is a curvature radius when points are not thinned out excessively. FIG. 11 is an image diagram of the second radius rb. As shown in FIG. 11, the second radius rb is a radius of an arc Cb when both the chord error with the front line segment Ls and the chord error of the rear line segment Le are the permissible error Edef From another perspective, the second radius rb is a radius of an arc passing through three points in which the front distance Ds and the rear distance De are the same and the chord error is the permissible error Edef.

In the same manner, when the return path chord error Eh is the permissible error Edef or less, the curvature radius correcting portion 36 temporarily stores the curvature radius R (=ra) as the return path curvature radius Rh. On the other hand, when the return path chord error Eh exceeds the permissible error Edef, the curvature radius correcting portion 36 temporarily stores the second radius rb calculated by the Formula 6 as the return path curvature radius Rh.

If the outward path curvature radius Ro and the return path curvature radius Rh are calculated, then the curvature radius correcting portion 36 corrects the curvature radius R at the object point Pt to a smaller value of the outward path curvature radius Ro and the return path curvature radius Rh. In other words, correction to R=min (Ro, Rh) is executed. The speed calculating portion 38 applies the curvature radius R outputted from the curvature radius correcting portion 36 to the Formula 1 to calculate the permissible passing speed F at the object point Pt.

Next, a flow of calculating the permissible passing speed F will be explained with reference to FIG. 12 and FIG. 13. In the machining program, moving points of P0 to PI of the drive axis are recorded. In this case, when the permissible passing speed F is calculated, the control unit 12 firstly initializes a counter i to set i=1 (S10). Following this, the curvature radius calculating portion 32 executes setting of the object point Pt=Pi, the start point Ps=Pi−1, and the end point Pe=Pi+1, and obtains respective coordinates of each of the points Pt, Ps, and Pe and the angle θ (S12, S14). Further, the curvature radius calculating portion 32 calculates the first radius ra (S16). More specifically, the curvature radius calculating portion 32 calculates the distance Dse from the coordinates of the start point Ps and the end point Pe, and applies the distance Dse and the angle θ to the Formula 2 to calculate the first radius ra. The curvature radius calculating portion 32 outputs the first radius ra as the curvature radius R (S18).

The point sequence evaluating portion 34 calculates the outward path chord error Eo and the return path chord error Eh based on the curvature radius R (S20). More specifically, the point sequence evaluating portion 34 calculates the front distance Ds and the rear distance De based on each of the points Pt, Ps, and Pe and applies the front distance Ds, the rear distance De, the curvature radius R, and the angle θ to the Formulas 4 and 5.

Following this, the point sequence evaluating portion 34 compares the calculated outward path chord error Eo and the previously set permissible error Edef, and outputs the comparison result to the curvature radius correcting portion 36 (S22). When Eo≤Edef, the curvature radius correcting portion 36 temporarily stores the first radius ra as the outward path curvature radius Ro (S24). On the other hand, when Eo>Edef, the curvature radius correcting portion 36 applies the permissible error Edef and the angle θ to Formula 6 and calculates the second radius rb (S26). Moreover, the curvature radius correcting portion 36 temporarily stores the calculated second radius rb as the outward path curvature radius Ro (S28).

In the same manner, the point sequence evaluating portion 34 compares the calculated return path chord error Eh and the permissible error Edef, and outputs the comparison result to the curvature radius correcting portion 36 (S30). When Eh≤Edef, the curvature radius correcting portion 36 temporarily stores the first radius ra as the return path curvature radius Rh (S32). On the other hand, when Eh>Edef, the curvature radius correcting portion 36 applies the permissible error Edef and the angle θ to Formula 6 and calculates the second radius rb (S34). Note that, naturally, if the second radius rb has already been calculated in S26, this step S34 may be omitted. The curvature radius correcting portion 36 temporarily stores the second radius rb as the return path curvature radius Rh (S36).

If the outward path curvature radius Ro and the return path curvature radius Rh are calculated, then the curvature radius correcting portion 36 compares the outward path curvature radius Ro with the return path curvature radius Rh, and specifies a smaller value as the curvature radius R at the object point Pt (S38). Moreover, the curvature radius correcting portion 36 outputs the specified curvature radius R to the speed calculating portion 38. The speed calculating portion 38 applies the obtained curvature radius R to the Formula 1 to calculate the permissible passing speed F at the object point Pt (S40).

When the permissible passing speed F is obtained, after the counter i is incremented (S42), steps S12 to S44 are repeated. In other words, when the permissible passing speed F is obtained at one point, a point adjacent to the one point is set to a new object point Pt, and the permissible passing speed F at the new object point Pt is obtained. Such processing is repeated until i=I is achieved.

As clear from the above explanation, in this example, the rightness or wrongness of the point sequence is determined based on the chord error of the passing arc C passing through the object point Pt and the points Ps, Pe before and after the object point Pt, and when the chord error is large, the curvature radius R is corrected. This configuration inhibits a large variation of the curvature radius R and thus the permissible passing speed F, so that a feed rate of the drive axis can be stabilized. Also, in this example, the curvature radius R is corrected while considering the chord error not only in the outward path but also in the return path. Consequently, in machining of workpiece by reciprocating the drive axis, the feed rate can be stabilized both in the outward path and the return path.

Additionally, in this example, the permissible passing speed F is calculated after a single curvature radius R is determined based on the outward path curvature radius Ro and the return path curvature radius Rh. However, a permissible passing speed Fo may be calculated based on the outward path curvature radius Ro and a permissible passing speed Fh may be calculated based on the return path curvature radius Rh, and a smaller value of the two speeds Fo, Fh may be specified as the permissible passing speed F at the object point Pt. In other words, the permissible passing speed F may be obtained based on the following Formula 7.

$$F = \min(\sqrt{\alpha \cdot R_o}, \sqrt{\alpha \cdot R_h}) \qquad \text{Formula 7.}$$

Also, while an explanation has been made with the premise of reciprocating machining of workpiece in the above description, there is a case that machining is executed in an outward path and fast-feeding is executed by air-cut in a return path. In such a case, the chord error in the return path does not need to be considered. Accordingly, in this case, calculation of the return path chord error Eh is omitted, and the outward path curvature radius Ro calculated in steps S22 to S28 may be outputted as the corrected curvature radius R. With such configuration, the amount of calculation can be reduced.

Figure 12:
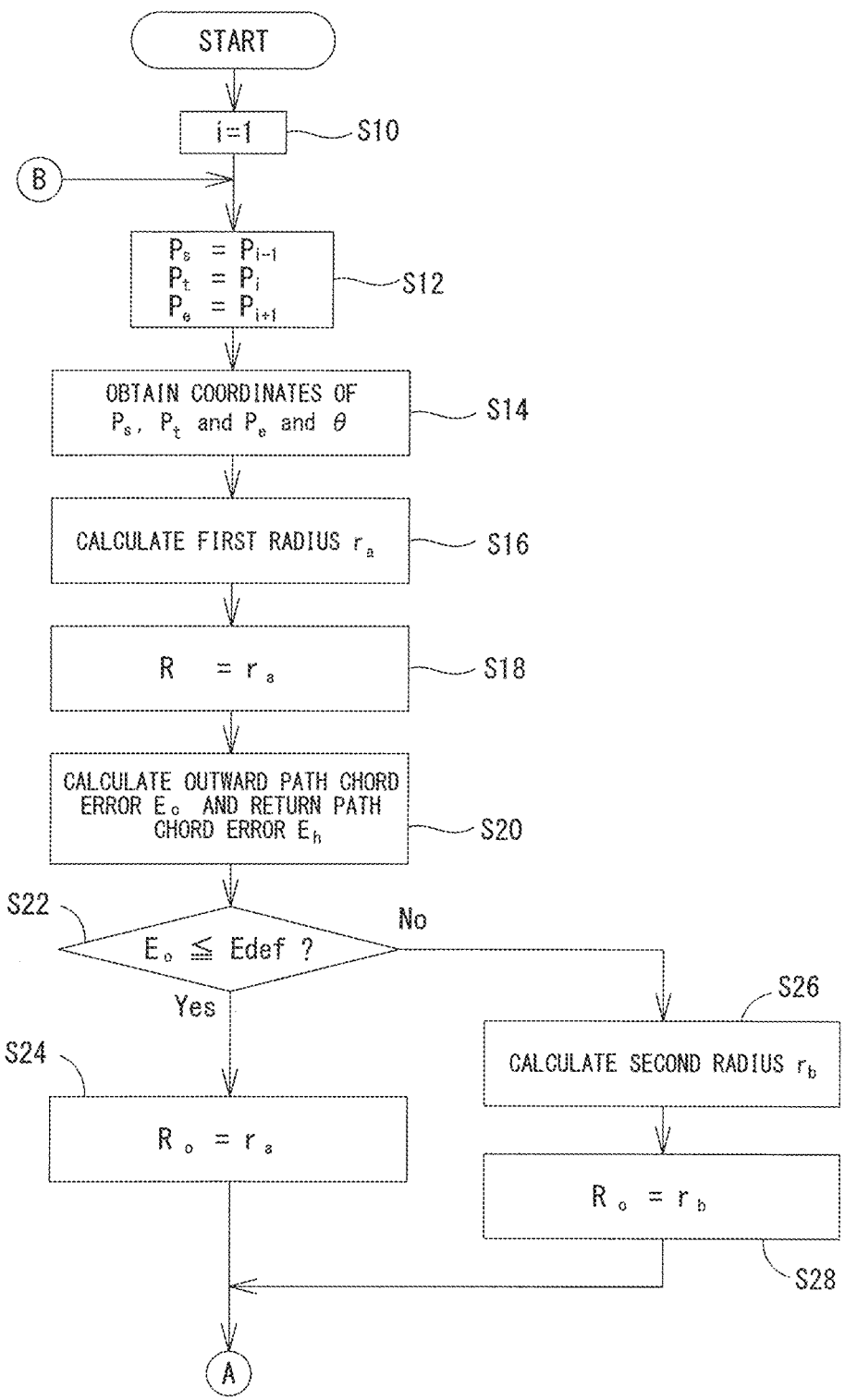
FIG. 12 is a flow chart showing a flow of calculation of a permissible passing speed.
Figure 13:
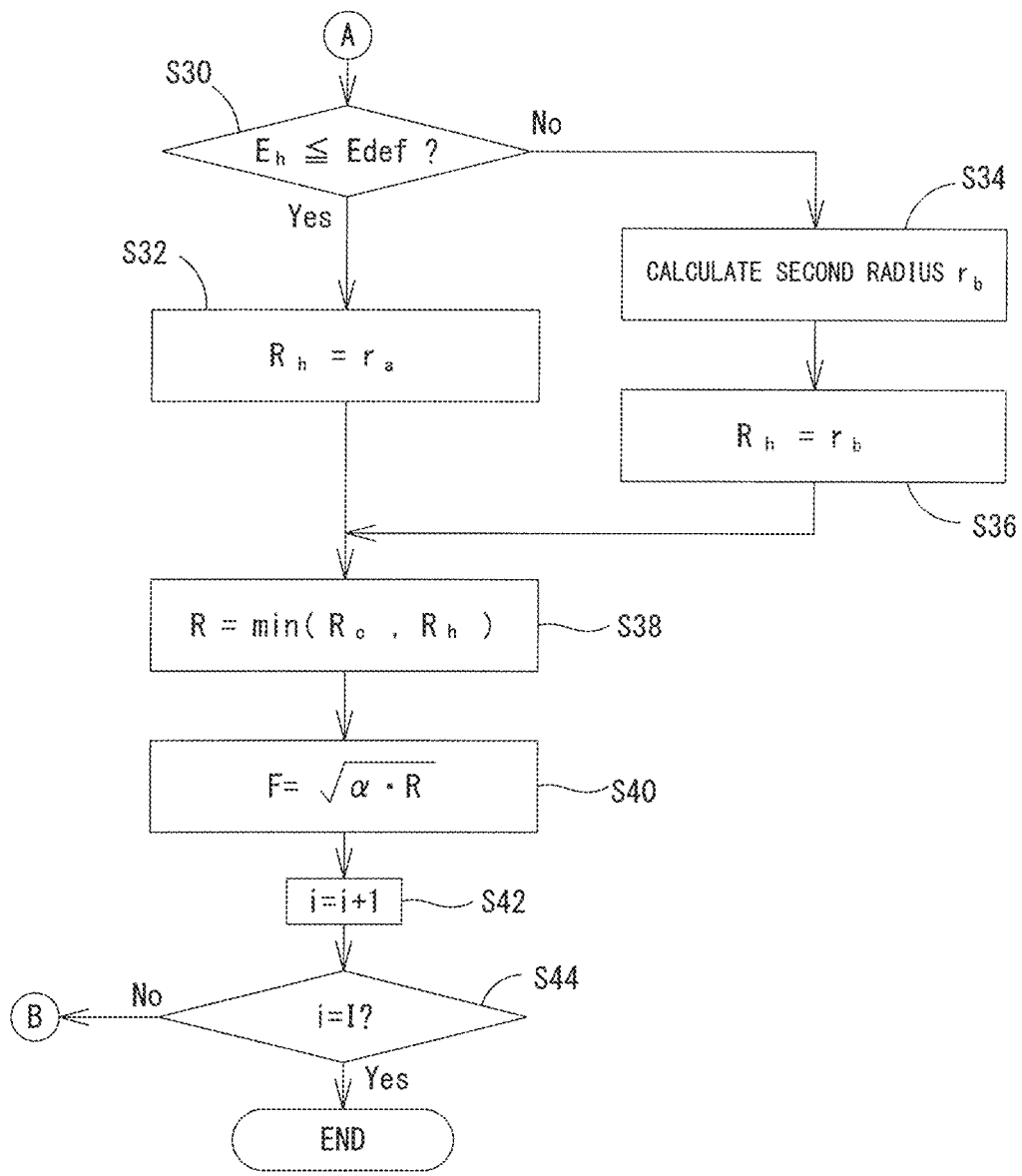
FIG. 13 is a flow chart showing a flow of calculation of the permissible passing speed.

Also, while the outward path curvature radius Ro and the return path curvature radius Rh at the object point Pt=Pi are calculated at the same timing in a flow chart in FIG. 12 and FIG. 13, this step may be changed appropriately. For example, the outward path curvature radius Ro_i and the return path curvature radius Rh_i+1 at Pi+1 may be calculated at the same timing. In other words, when i=1, based on P0, P1 and P2, the outward path curvature radius Ro_1 at P1 and the return path curvature radius Rh_2 at P2 may be calculated, and when i=2, based on P1, P2, P3, and P4, the outward path curvature radius Ro_2 at P2 and the return path curvature radius Rh_3 at P3 may be calculated. Moreover, based on the return path curvature radius Rh_2 and the outward path curvature radius Ro_2 at P2 calculated at these two timings, the final curvature radius R2=min (Ro_2, Rh_2) at P2 may be calculated.

REFERENCE SIGNS LIST

10: Numerical control apparatus, 12: Control unit, 14: Storage unit, 18: Input unit, 20: Output unit, 21: Data bus, 22: Program reading portion, 24: Program interpreting portion, 26: Permissible passing speed calculating portion, 28: Servo command position interpolating portion, 30: Servo controlling portion, 32: Curvature radius calculating portion, 34: Point sequence evaluating portion, 36: Curvature radius correcting portion, 38: Speed calculating portion.

The invention claimed is:

1. A numerical control apparatus which controls movement of a drive axis of a machine in accordance with a machining program, the numerical control apparatus comprising:
   a curvature radius calculating portion which calculates a first radius which is a radius of a passage arc passing through three points of a start point, an object point, and an end point which are continuously present among a plurality of moving points of the drive axis recorded in the machining program as a curvature radius at the object point;
   a point sequence evaluating portion which calculates a chord error which is an approximation error between the passage arc and a front line segment connecting the object point and the start point or a rear line segment connecting the object point and the end point and compares the calculated chord error and a previously defined permissible error;
   a curvature radius correcting portion which calculates a second radius which is a radius of an arc in which a chord error with the front line segment and the rear line segment is the permissible error or less when the calculated chord error exceeds the permissible error and corrects a curvature radius at the object point to the second radius; and
   a speed calculating portion which calculates a permissible passing speed of the drive axis at the object point based on the curvature radius at the object point.

2. The numerical control apparatus according to claim 1, wherein
   the curvature radius correcting portion calculates the second radius $r_b$ based on a formula of $r_b = E_{def}/(1-\cos(\theta/2))$, wherein an angle at the object point in movement from a start point passing through the object point to advance to an end point is $\theta$, and the permissible error is $E_{def}$.

3. The numerical control apparatus according to claim 1, wherein
   the point sequence evaluating portion calculates an approximation error between the passage arc and the rear line segment as an outward path chord error, and calculates an approximation error between the passage arc and the front line segment as a return path chord error, and
   the speed calculating portion calculates a permissible passing speed based on a smaller curvature radius between a curvature radius specified based on the outward path chord error and a curvature radius specified based on the return path chord error.

4. The numerical control apparatus according to claim 3, wherein
   the curvature radius correcting portion specifies the first radius as an outward path curvature radius when the outward path chord error is the permissible error or less, and specifies the second radius as the outward path curvature radius when the outward path chord error exceeds the permissible error, and
   specifies the first radius as a return path curvature radius when the return path chord error is the permissible error or less, and specifies the second radius as the return path curvature radius when the return path chord error exceeds the permissible error, and then
   corrects a smaller value between the outward path curvature radius and the return path curvature radius as the curvature radius at the object point.

5. A numerical control method of controlling movement of a drive axis of a machine in accordance with a machining program, the method comprising the steps of:
   calculating a radius of a passage arc passing through three points of a start point, an object point, and an end point which are continuously present among a plurality of moving points of the drive axis recorded in the machining program as a first radius;
   calculating a chord error which is an approximation error between the passage arc and a front line segment connecting the object point and the start point or a rear line segment connecting the object point and the end point to compare the calculated chord error and a previously defined permissible error;
   calculating a second radius which is a radius of an arc in which a chord error with the front line segment and the rear line segment is the permissible error or less when the calculated chord error exceeds the permissible error to correct a curvature radius at the object point to the second radius; and
   calculating a permissible passing speed of the drive axis at the object point based on the curvature radius at the object point.

* * * * *